US012776080B2

(12) United States Patent
Nishiuchi

(10) Patent No.: US 12,776,080 B2
(45) Date of Patent: Oct. 27, 2026

(54) BOARD REFLOW INSPECTION APPARATUS AND METHOD

(71) Applicant: KABUSHIKI KAISHA TOSHIBA, Tokyo (JP)

(72) Inventor: Hideo Nishiuchi, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 257 days.

(21) Appl. No.: 18/411,599

(22) Filed: Jan. 12, 2024

(65) Prior Publication Data

US 2024/0242332 A1 Jul. 18, 2024

(30) Foreign Application Priority Data

Jan. 17, 2023 (JP) ................................ 2023-005205

(51) Int. Cl.
*G06T 11/60* (2026.01)
*G06T 7/00* (2017.01)

(52) U.S. Cl.
CPC ............ *G06T 11/60* (2013.01); *G06T 7/0008* (2013.01); *G06T 2207/30152* (2013.01)

(58) Field of Classification Search
CPC ........... G06T 11/60; G06T 2207/30152; G06T 7/0008
See application file for complete search history.

(56) References Cited

U.S. PATENT DOCUMENTS

| | | | | |
|---|---|---|---|---|
| 7,653,510 | B2 * | 1/2010 | Hirohata | G01R 31/2803 714/E11.193 |
| 2022/0392049 | A1 * | 12/2022 | Tu | G06T 5/90 |
| 2023/0297098 | A1 * | 9/2023 | Swaminathan | G05B 19/4184 702/184 |

(Continued)

FOREIGN PATENT DOCUMENTS

| | | | |
|---|---|---|---|
| JP | 2008-130865 | A | 6/2008 |
| JP | 2009-094283 | A | 4/2009 |
| JP | 2019-16774 | A | 1/2019 |

(Continued)

OTHER PUBLICATIONS

Japanese Office Action dated Jun. 30, 2026, issued in Japanese Patent Application No. 2023-005205 (with English translation: Documents 18-23 being cited therein).

*Primary Examiner* — Kenny A Cese
(74) *Attorney, Agent, or Firm* — Oblon, McClelland, Maier & Neustadt, L.L.P.

(57) ABSTRACT

In an embodiment, an information processing apparatus includes an image processing unit and a determination unit. The image processing unit generates a synthesis image by synthesizing a component with a pre-mount image prior to mounting of the component onto a board, based on the pre-mount image, adsorption information indicating an adsorption state of the component in a component mounting apparatus, and setting information indicating a setting position set as a position where the component is to be mounted on the board. The determination unit determines whether or (Continued)

not it is appropriate to mount the component at the setting position by inputting, to a machine learning model outputting an inspection result of a post-reflow inspection from an input of image data based on a pre-reflow image, image data based on the pre-mount image and the synthesis image.

10 Claims, 8 Drawing Sheets

(56) References Cited

U.S. PATENT DOCUMENTS

| | | | |
|---|---|---|---|
| 2023/0298155 | A1 | 9/2023 | Nishiuchi |

FOREIGN PATENT DOCUMENTS

| | | | |
|---|---|---|---|
| JP | 2019-110257 | A | 7/2019 |
| JP | 2020-004923 | A | 1/2020 |
| JP | 2021-90076 | A | 6/2021 |
| JP | 2021-120631 | A | 8/2021 |
| JP | 2022-52199 | A | 4/2022 |
| JP | 2022-088876 | A | 6/2022 |
| JP | 2022-140951 | A | 9/2022 |
| JP | 2022-160221 | A | 10/2022 |
| JP | 2023-138330 | A | 10/2023 |
| KR | 10-2022-0138822 | | 10/2022 |

* cited by examiner

BOARD REFLOW INSPECTION APPARATUS AND METHOD

CROSS-REFERENCE TO RELATED APPLICATIONS

This application is based upon and claims the benefit of priority from Japanese Patent Application No. 2023-005205, filed Jan. 17, 2023; the entire contents of which are incorporated herein by reference.

FIELD

Embodiments described herein relate generally to an information processing apparatus and an information processing method.

BACKGROUND

In joining a component to a board such as a printed wiring board or a printed board by means of soldering, room-temperature solder and the component are mounted in this order onto the board. By performing a reflow process with the solder and the component mounted on the board, the solder is melted, allowing the component to be joined to the board by means of soldering. The component mounting apparatus (mounter) adsorbs, with a nozzle, the component to be mounted on the board from a parts feeder or a tray, and mounts the component adsorbed by the nozzle on the board on which the solder is mounted.

When printed boards are manufactured by means of soldering, as described above, defectiveness in the printed boards is detected prior to the reflow process, from the viewpoint of suppressing both an increase in loss of members caused by occurrence of defective products and an increase in the number of steps required to repair the defective products. For example, an image showing a state of adsorption of a component into a nozzle in the component mounting apparatus is acquired by a photographing apparatus such as a camera, and whether or not the component will be appropriately joined to the board is determined based on the adsorption state of the component shown in the image. If whether or not the component will be appropriately joined to the board is determined prior to the reflow process, it is required to perform the determination in view of the state of the board prior to component mounting, such as a state of mounting of solder onto the board, in addition to the adsorption state of the component in the component mounting apparatus. That is, it is required to correctly determine, prior to the reflow process, whether or not the position at which the component is to be mounted on the board is appropriate in view of the state of the board prior to mounting of the component as well as the adsorption state of the component in the component mounting apparatus.

DETAILED DESCRIPTION

According to an embodiment, an information processing apparatus for soldering a component onto a board is provided. The information processing apparatus includes an image processing unit and a determination unit. The image processing unit generates a synthesis image by synthesizing the component with a pre-mount image prior to mounting of the component onto the board, based on the pre-mount image, adsorption information indicating an adsorption state of the component in a component mounting apparatus, and setting information indicating a setting position set as a position at which the component is to be mounted on the board. The determination unit determines whether or not it is appropriate to mount a component on the board at a setting position set in the setting information by inputting, to a machine learning model that outputs an inspection result of a post-reflow inspection from an input of image data based on a pre-reflow image, image data based on a pre-mount image and a synthesis image.

Hereinafter, embodiments, etc. will be described with reference to the accompanying drawings.

First Embodiment

Figure 1:
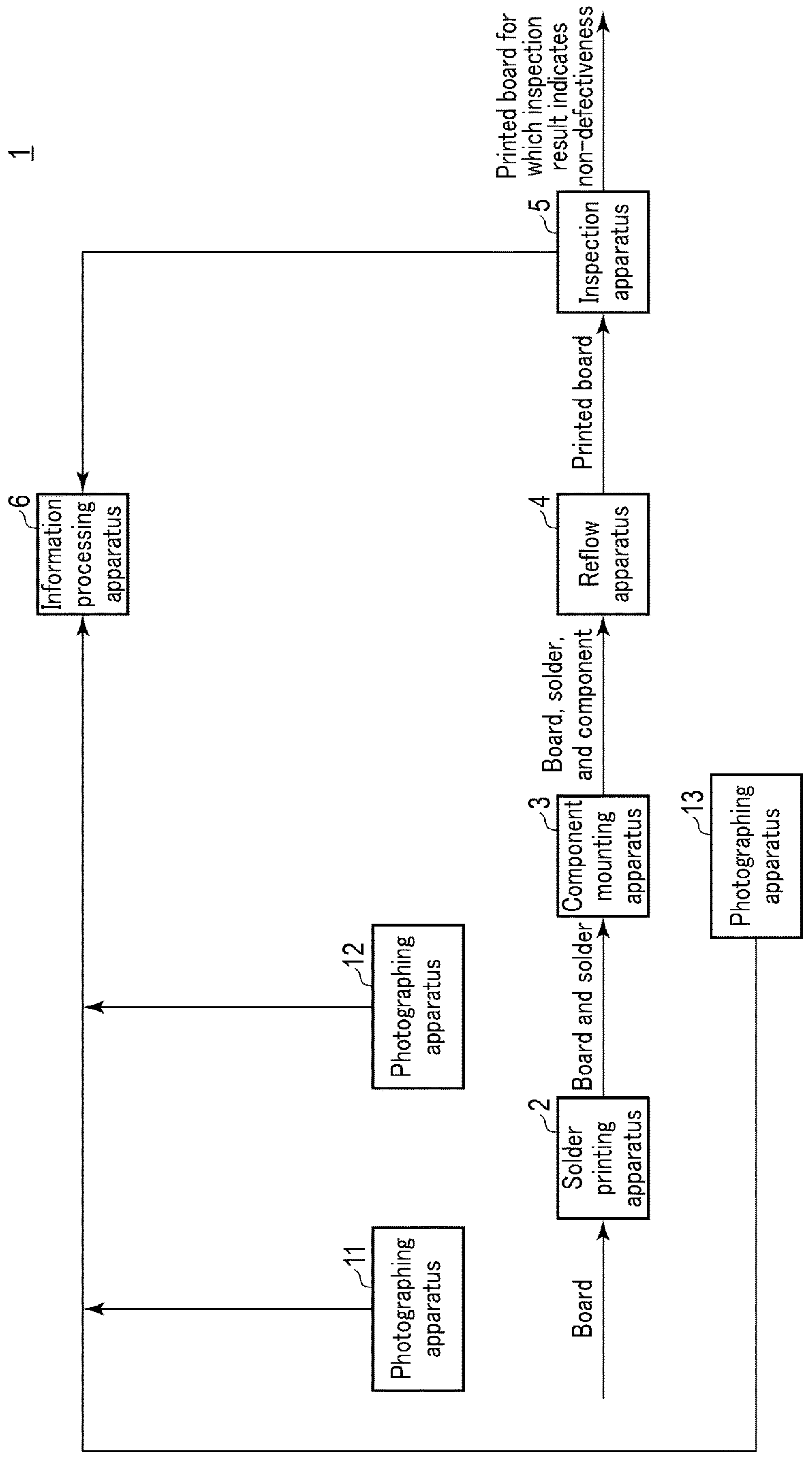
FIG. 1 is a schematic diagram showing a manufacturing system according to a first embodiment as an example of a manufacturing system of manufacturing a printed board.

A first embodiment will be described as an example of the embodiment. FIG. 1 shows a manufacturing system 1 according to the first embodiment, as an example of a manufacturing system in which printed boards are manufactured. As shown in FIG. 1, etc., the manufacturing system 1 includes a solder printing apparatus 2, a component mounting apparatus (mounter) 3, a reflow apparatus 4, an inspection apparatus 5, and an information processing apparatus 6. In the manufacturing system 1, a manufacturing line of printed boards is formed, and the solder printing apparatus 2, the component mounting apparatus 3, the reflow apparatus 4, and the inspection apparatus 5 are arranged in this order from the upstream side in the manufacturing line.

In the manufacturing line, boards are conveyed to the solder printing apparatus 2. Each board may be a printed wiring board, or a printed board (printed circuit board) with a component such as a chip component already attached onto a printed wiring board. The solder printing apparatus 2 mounts solder onto the board by, for example, printing solder to a pad, a land, etc. formed on a surface of the board. In one example, solder mounting onto the board may be performed by printing solder onto a surface of a component already attached to a printed board, which is a substrate. In the solder printing apparatus 2, room-temperature solder is mounted onto a board, namely, solder is mounted onto a board in a non-melted state. A method of mounting solder onto the board is not limited to printing. In one example, solder mounting onto the board may be performed by either dispensing (applying) solder thereto or mounting a solder sheet thereon.

The boards on which solder is mounted are conveyed to the component mounting apparatus 3. The component mounting apparatus 3 mounts a component to be newly attached onto the board. Examples of the component to be mounted onto the board include, for example, chip components, IC packages, etc. Through the mounting of the component, the solder is interposed between the board and the component. The board on which the solder and the component are mounted is conveyed to the reflow apparatus 4. The reflow apparatus 4 performs soldering by means of a reflow process. Through the reflow process, the solder mounted on the board is melted, and a newly mounted component is joined to the board. Thereby, a printed board with the mounted component attached to the board is formed. In one example, a newly mounted component is joined to a pad, a land, etc. formed on a surface of the board by means of soldering. In another example, a newly mounted component is joined to a component already mounted on the board by soldering.

A manufactured printed board, namely, a printed board obtained by joining a component to a board by means of a reflow process in the reflow apparatus 4, is conveyed to the inspection apparatus 5. The inspection apparatus 5 inspects the manufactured printed board, and determines whether the manufactured printed board is defective or non-defective. Through the inspection at the inspection apparatus 5, only printed boards determined to be non-defective are distributed to the market as products. The inspection apparatus 5 performs, for example, a visual inspection and an electricity test on the manufactured printed boards. In the visual inspection, images of a printed board obtained by joining a component to a board by means of a reflow process are acquired by photography, etc., and whether the manufactured printed board is defective or non-defective is determined based on the acquired images of the printed board. In the electricity test, whether the manufactured printed boards are defective or non-defective is determined by, for example, allowing electricity to flow through the printed boards and measuring an amount of the electricity using a tester. The inspection apparatus 5 transmits information indicating an inspection result obtained by an actually performed inspection to the information processing apparatus 6.

In the manufacturing system 1, photographing apparatuses 11 to 13 are provided. Each of the photographing apparatuses 11 to 13 is, for example, a camera or a video camera. The photographing apparatus 11 is arranged on an upstream side of the solder printing apparatus 2, and photographs an image of only a board. The photographing apparatus 12 is arranged between the solder printing apparatus 2 and the component mounting apparatus 3, and photographs an image of the board on which only solder is mounted. Thereby, in the manufacturing system 1, two types of images, namely, an image of only a board and an image of the board on which only solder is mounted are photographed by the photographing apparatuses 11 and 12 as images prior to a reflow process to be performed by the reflow apparatus 4. The image of only the board and the image of the board on which only solder is mounted are photographed as pre-mount images prior to mounting of a component onto the board in the component mounting apparatus 3.

Figure 2:
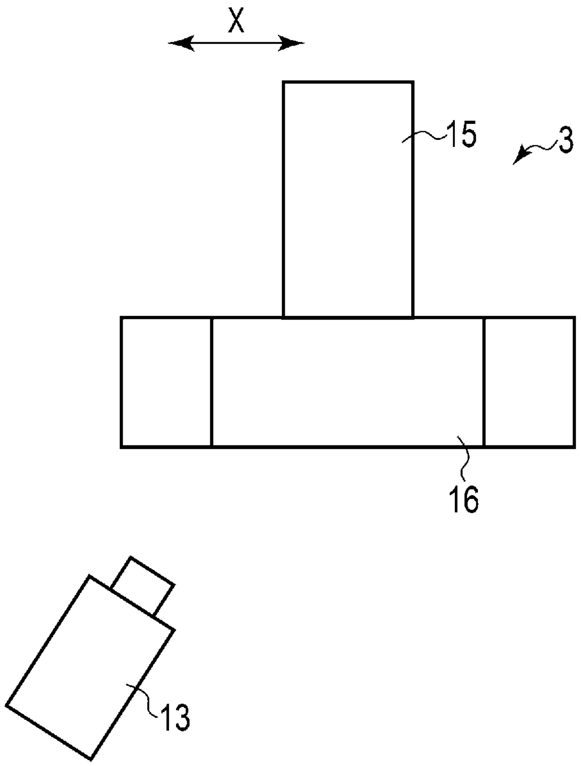
FIG. 2 is a schematic diagram showing a component mounting apparatus and the vicinity thereof in the manufacturing system according to the first embodiment.

FIG. 2 shows the component mounting apparatus 3 and the vicinity thereof. In FIG. 2, an X direction (a direction shown by an arrow X) is identical to or substantially identical to a conveyance direction of the manufacturing line of the board. A Y direction (a direction orthogonal to or substantially orthogonal to FIG. 2) is identical to or substantially identical to a width direction of the board in the manufacturing line, and is orthogonal to or substantially orthogonal to a conveyance direction in the manufacturing line. As shown in FIGS. 1 and 2, the photographing apparatus 13 is arranged in the component mounting apparatus 3 or in the vicinity thereof. The component mounting apparatus 3 includes a nozzle 15. In the component mounting apparatus (mounter) 3, the nozzle 15 adsorbs a component 16 to be mounted on the board from a parts feeder or a tray. The component 16 adsorbed by the nozzle 15 is mounted on the board on which solder is mounted.

The photographing apparatus 13 photographs a state of the component 16 adsorbed by the nozzle 15 of the component mounting apparatus 3. The photographing apparatus 13 photographs the nozzle 15 and the component 16 adsorbed by the nozzle 15 from one side in a direction intersecting (orthogonal to or substantially orthogonal to) both of the X and Y directions. In one example, a manufacturing line of the board extends horizontally or substantially horizontally, and the photographing apparatus 13 photographs the nozzle 15 and the component 16 adsorbed by the nozzle 15 from vertically below. The photographing apparatus 13 photographs an image of the component 16 adsorbed by the nozzle 15 as described above as adsorption information indicating a state of adsorption of the component 16 in the component mounting apparatus 3.

Each of the photographing apparatuses 11 to 13 transmits the photographed image (image data) to the information processing apparatus 6. Thus, the information processing apparatus 6 acquires the above-described two types of images photographed by the photographing apparatuses 11 and 12 as pre-mount images prior to component mounting and prior to a reflow process. Also, the information processing apparatus 6 acquires the image photographed by the photographing apparatus 13 as adsorption information indicating an adsorption state of the component in the component mounting apparatus 3. Each of the photographing apparatuses 11 to 13 performs photography in real time every time a single board is conveyed to the manufacturing line. Thus, every time a single board is conveyed to the manufacturing line, the information processing apparatus 6 acquires, in real time, pre-mount images prior to component mounting photographed by the photographing apparatuses 11 and 12 and an image photographed by the photographing apparatus 13 as adsorption information indicating a state of adsorption.

In the present embodiment, the information processing apparatus 6 transmits, to the component mounting apparatus 3, an instruction regarding component mounting onto the board. In one example, in an instruction from the information processing apparatus 6 to the component mounting apparatus 3, namely, in an instruction regarding component mounting onto the board, an X-coordinate with respect to the X direction (conveyance direction) and a Y-coordinate with respect to the Y direction (width direction of the manufacturing line) are shown as position information regarding the position at which the component is to be mounted on the board. Also, if a posture of a component to be mounted on the board can be adjusted by the component mounting apparatus 3, posture information regarding a posture of the component to be mounted on the board may be shown in the instruction regarding component mounting onto the board, in addition to the X-coordinate and the Y-coordinate shown as the position information. In this case, a reference direction such as an axial direction or a longitudinal direction is defined in the component to be mounted on the board. An angle formed by the reference direction of the component with the X or Y direction is shown as posture information.

The component mounting apparatus 3 mounts the component onto the board at a position corresponding to the instruction from the information processing apparatus 6. If the posture information is shown in the instruction regarding component mounting onto the board, the component mounting apparatus 3 mounts the component onto the board in a posture corresponding to the instruction from the information processing apparatus 6.

Figure 3:
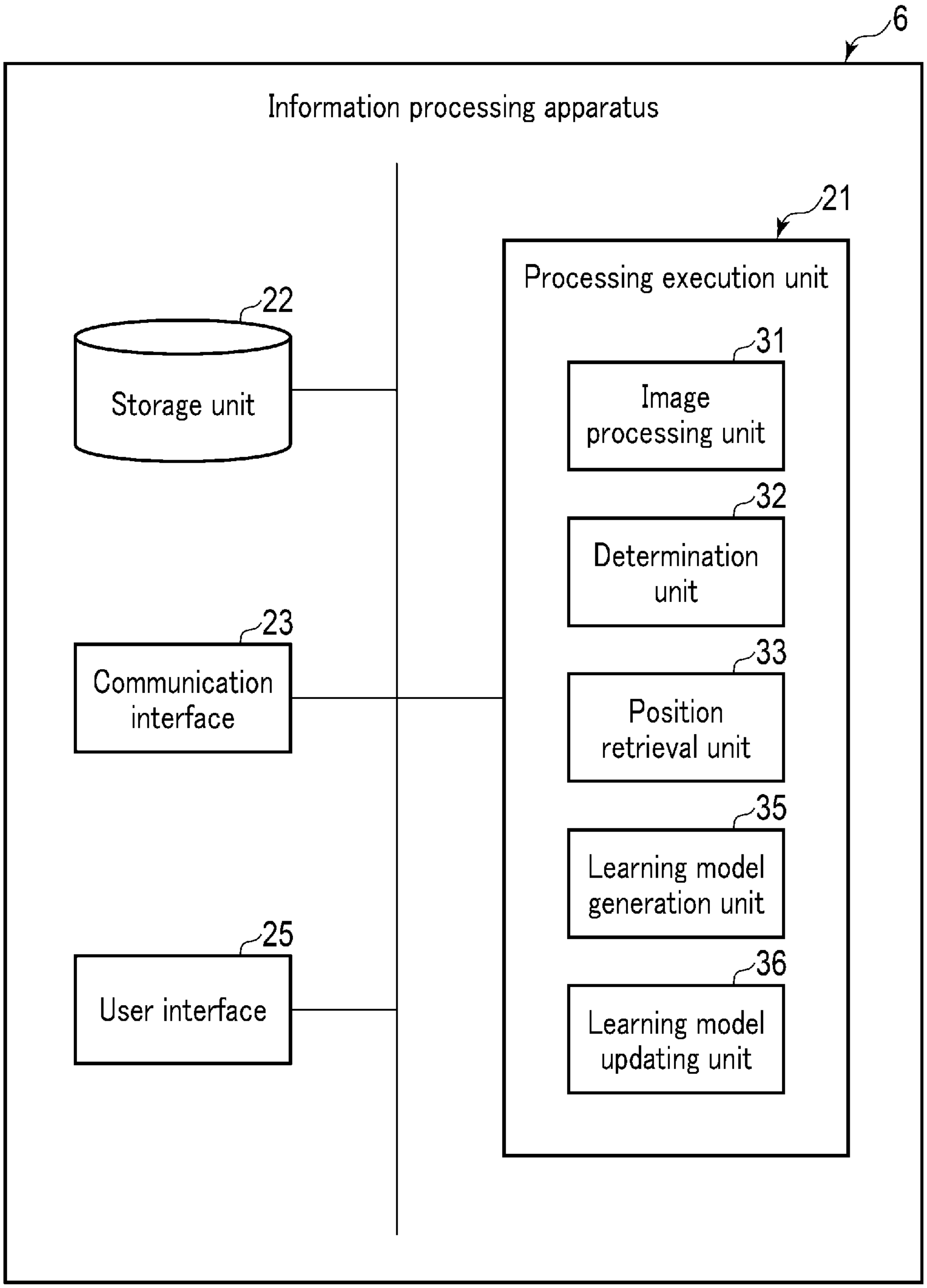
FIG. 3 is a block diagram schematically showing a configuration of an information processing apparatus of the manufacturing system according to the first embodiment.

FIG. 3 shows an example of a configuration of the information processing apparatus 6 according to the present embodiment. As shown in FIG. 3, the information processing apparatus 6 includes a processing execution unit 21, a storage unit 22, a communication interface 23, and a user interface 25. The processing execution unit 21 includes an image processing unit 31, a determination unit 32, a position retrieval unit 33, a learning model generation unit 35, and a learning model updating unit 36. Each of the image processing unit 31, the determination unit 32, the position retrieval unit 33, the learning model generation unit 35, and the learning model updating unit 36 performs part of the processing performed by the processing execution unit 21.

In one example, the information processing apparatus 6 is configured of a computer, etc., and a processor or an integrated circuit of the computer functions as the processing execution unit 21. A processor or an integrated circuit of a computer includes one of a central processing unit (CPU), an application-specific integrated circuit (ASIC), a graphics processing unit (GPU), a microcomputer, a field-programmable gate array (FPGA), a digital signal processor (DSP), etc. The number of integrated circuits, etc. included in a computer that functions as the information processing apparatus 6 may be either one or more than one.

In a computer that functions as the information processing apparatus 6, a storage medium (non-transitory storage medium) of the computer functions as the storage unit 22. The storage medium may include an auxiliary storage in addition to a primary storage such as a memory. Examples of the storage medium include magnetic disks, optical disks (CD-ROMs, CD-Rs, DVDs, etc.), magneto-optical disks (MOs, etc.), semiconductor memories, etc. The computer that functions as the information processing apparatus 6 mayinclude only one storage medium, etc., or a plurality of storage media.

In a computer that functions as the information processing apparatus 6, a processor or an integrated circuit executes programs, etc. stored in the storage medium, etc., and thereby processing by the processing execution unit 21, to be described below, is performed. In one example, in a computer that functions as the information processing apparatus 6, programs to be executed by a processor, etc. may be stored in, for example, a computer (server) connected via a network such as the Internet or a server such as a cloud environment. In this case, the processor downloads the programs via the network. In one example, the information processing apparatus 6 is configured of a plurality of computers that are separate from one another. In this case, processing by the processing execution unit 21, to be described below, is performed by processors, integrated circuits, etc. of the computers.

In one example, the information processing apparatus 6 is configured of a server of a cloud environment. The infrastructure of the cloud environment is configured of a virtual processor such as a virtual CPU and a cloud memory. In the server of the cloud environment of which the information processing apparatus 6 is configured, a virtual processor, etc. functions as the processing execution unit 21, and processing by the processing execution unit 21, to be described below, is performed by the virtual processor, etc. The cloud memory functions as the storage unit 22.

In the information processing apparatus 6, the communication interface 23 is configured of an interface that accesses external devices such as the component mounting apparatus 3, the inspection apparatus 5, and the photographing apparatuses 11 to 13. The information processing apparatus 6 is capable of communicating, either in a wired or wireless manner, with an external device via the communication interface 23. Therefore, in the information processing apparatus 6, information indicating an inspection result at the inspection apparatus 5 and images photographed by the photographing apparatuses 11 to 13 are acquired via the communication interface 23. Also, the information processing apparatus 6 transmits, via the communication interface 23, an instruction regarding component mounting to the component mounting apparatus 3.

In the information processing apparatus 6, various types of operations, etc. are input by a user, etc. of the manufacturing system 1 via the user interface 25. At the user interface 25, one of a button, a switch, a touch panel, etc. is provided as an operation member to which an operation is input by a user, etc. of the manufacturing system 1. In the user interface 25, various types of information are reported to a user, etc. of the manufacturing system 1. The reporting of the information is performed by, for example, screen display, audio broadcasting, etc. In one example, the user interface 25 is provided as an external device of the information processing apparatus 6, and is provided separately from the computer, etc. that configures the information processing apparatus 6.

Figure 4:
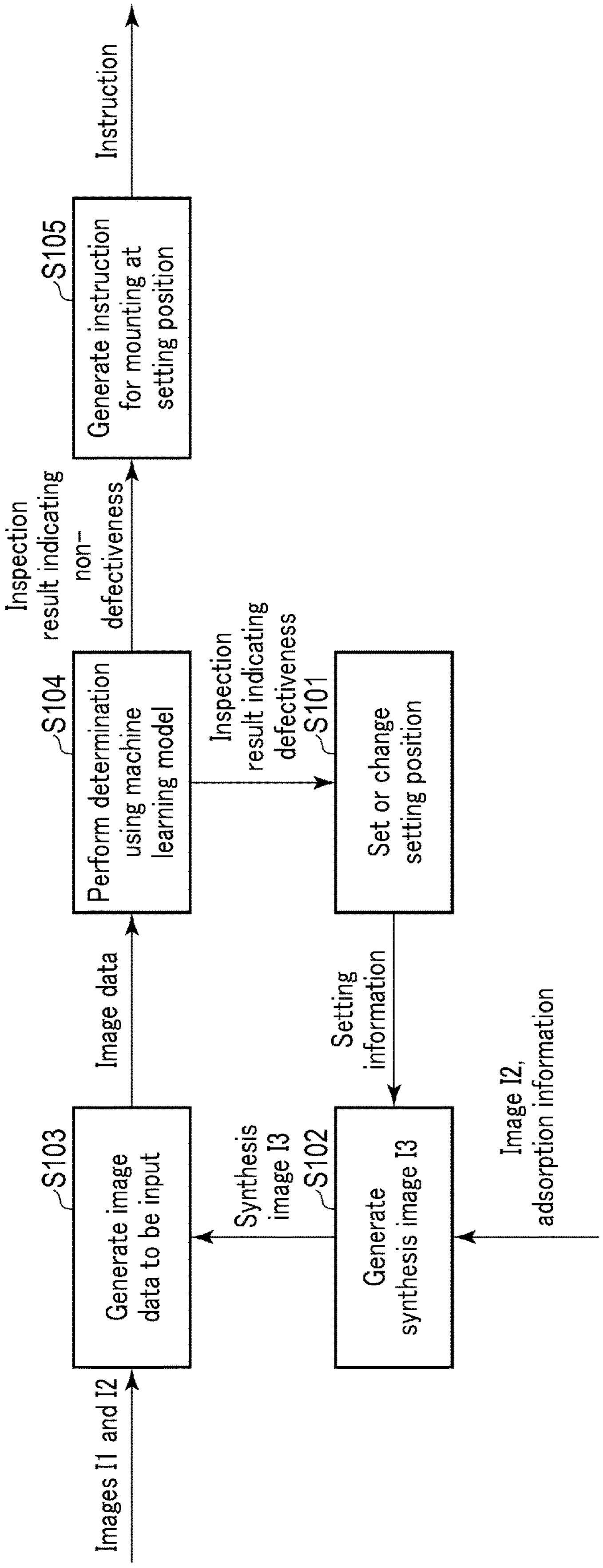
FIG. 4 is a schematic diagram showing an example of processing by an image processing unit, a determination unit, and a position retrieval unit in the information processing apparatus of the manufacturing system according to the first embodiment.

Hereinafter, processing performed by the processing execution unit 21 will be described. FIG. 4 shows an example of processing by the image processing unit 31, the determination unit 32, and the position retrieval unit 33. The processing shown in FIG. 4 is performed every time a single board is conveyed to the manufacturing line. As shown in FIG. 4, etc., the position retrieval unit 33 sets a setting position as the position at which the component is to be mounted on the board (S101). The position retrieval unit 33 generates setting information indicating a setting position set as the position at which the component is to be mounted on the board. The image processing unit 31 acquires, as pre-mount images prior to component mounting, an image I1 of only the board from the photographing apparatus 11 and an image I2 of the board on which only solder is mounted from the photographing apparatus 12. Also, the image processing unit 31 acquires an image photographed by the photographing apparatus 13 as adsorption information of the component in the component mounting apparatus 3. The image processing unit 31 acquires the setting information indicating the setting position set as the position at which the component is to be mounted on the board.

The image processing unit 31 generates a synthesis image I3 by synthesizing an image of the component with (superimposing it on) the image I2, which is a pre-mount image, based on the image I2, the adsorption information, and the setting information (S102). In the generating of the synthesis image I3, the image processing unit 31 extracts, based on the adsorption information, a position and a posture of the component in the adsorption state shown by the adsorption information. The image processing unit 31 calculates, based on the position and posture of the component extracted from the adsorption information, a position and a posture of the component in the image I2 corresponding to the adsorption state in the adsorption information. At this time, the position and posture of the component in the image I2 corresponding to the adsorption state in the adsorption information are calculated using, for example, a relational expression for coordinate-converting a coordinate system of the image to be the adsorption information into a coordinate system of the image I2. In this case, data showing a relationship between the coordinate system of the image to be the adsorption information and the coordinate system of the image I2, such as a relational expression for converting the coordinate system of the image to be the adsorption information into the coordinate system of the image I2, is stored in the storage unit 22, etc. In one example, the image processing unit 31 calculates an X-coordinate with respect to the X direction and a Y-coordinate with respect to the Y direction as a position of the component in the image I2 corresponding to the adsorption state in the adsorption information. Also, the image processing unit 31 calculates, as a posture of the component in the image I2 corresponding to the adsorption state in the adsorption information, an angle formed by the reference direction of the component with the X or Y direction.

The image processing unit 31 determines a position and a posture at which the component is to be superimposed in the synthesis image I3 based on the position and posture of the component in the image I2 corresponding to the adsorption state in the adsorption information and the setting position set in the setting information regarding the position at which the component is to be mounted. In one example, a displacement relative to the position of the component in the image I2 corresponding to the adsorption state in the adsorption information is set as the setting position. It is assumed, for example, that (X, Y)=(Xa, Ya) is calculated as a position of the component in the image I2 corresponding to the adsorption state in the adsorption information. Moreover, it is assumed that the posture of the component in the image I2 corresponding to the adsorption state in the adsorption information is shown by an angle θ formed by the reference direction of the component with the Y direction, and that an angle θa is calculated as the value of the angle θ. Furthermore, it is assumed that the setting position in the setting information is shown by a displacement Xb in the X direction and a displacement Yb in the Y direction from coordinates (Xa, Ya), and that (Xb, Yb)=(Xb0, Yb0) is set. In this case, in the synthesis image I3 (image I2), the component is superimposed at a position where (X, Y)=(Xa+Xb0, Ya+Yb0) is satisfied. In the state in which the angle θ formed by the reference direction of the component with the Y direction becomes the angle θa, the component is synthesized in the synthesis image I3.

In one example, the component mounting apparatus 3 is configured to adjust the posture of the component to be mounted on the board, allowing the posture of the component to be mounted on the board to be varied. In this case, a displacement relative to the posture of the component in the image I2 corresponding to the adsorption state in the adsorption information is set as a setting posture, together with the above-described setting of the setting position in the setting information. It is assumed, for example, that, in the setting information, the setting posture is shown by a displacement θb from the angle θa regarding the angle θ formed by the reference direction of the component with the Y direction, and that θb=θb0 is set. In this case, in a state in which the angle θ formed by the reference direction of the component with the Y direction becomes an angle θa+θb0, the component is synthesized in the synthesis image I3.

After the synthesis image I3 is generated, the image processing unit 31 generates image data to be used in processing at the determination unit 32 as pre-processing at the determination unit 32 (S103). The image processing unit 31 generates the image data by performing image processing using the images I1 and I2, which are two types of pre-mount images prior to component mounting, and the synthesis image I3. Thereby, image data based on the images I1 and I2 and the synthesis image I3 are generated as image data to be used in processing at the determination unit 32.

In one example, the image processing unit 31 converts each of the images I1 and I2 and the synthesis image I3 to grayscale. The image processing unit 31 adjusts positions of the images I1 and I2 and the synthesis image I3 with respect to one another, thereby correcting position gaps among the three types of images I1 to I3. The image processing unit 31 appends different color information to the grayscale-converted three types of images I1 to I3. At this time, for example, blue color information is appended to the image I1, green color information is appended to the image I2, and red color information is appended to the synthesis image I3. The image processing unit 31 synthesizes the three types of images I1 to I3 to which different color information is appended. Thereby, image data in which the three types of images I1 to I3 are synthesized is generated as the image data to be used in the processing at the determination unit 32. Therefore, in the present example, the image data to be used in the processing at the determination unit 32 is generated by adjusting the positions of the three types of images I1 to I3 and appending different color information to the three types of images I1 to I3, and then synthesizing the three types of images I1 to I3.

In another example, the image processing unit 31 lines up the images I1 and I2, which are pre-mount images prior to component mounting, and the synthesis image I3. Thereby, image data in which the three types of images I1 to I3 are lined up is generated as the image data to be used in the processing at the determination unit 32. Thus, in the present example, the image data to be used in the processing at the determination unit 32 is configured of the three types of images I1 to I3 that are lined up.

The storage unit 22 stores a machine learning model generated (constructed) as will be described below. As shown in FIG. 4, etc., the determination unit 32 determines, using the machine learning model, whether or not defectiveness will occur in a post-reflow inspection to be performed at the inspection apparatus 5, based on the image data generated at S103 by the image processing unit 31 (S104). That is, the determination unit 32 determines whether or not defectiveness will occur in a post-reflow inspection from image data based on the images I1 and I2 prior to component mounting acquired in real time and the synthesis image I3 generated by synthesizing the component with the image I2. The determination unit 32 inputs, to the machine learning model, the image data based on the images I1 to I3 generated by the image processing unit 31. The determination unit 32 causes the machine learning model to output information indicating whether or not defectiveness will occur in an inspection as an inspection result, and makes the inspection result output from the machine learning model a determination result regarding whether or not defectiveness will occur in the inspection.

Also, the determination unit 32 determines, based on the inspection result output from the machine learning model, whether or not it is appropriate to mount the component onto the board at the setting position set in the setting information. At this time, if the inspection result output from the machine learning model indicates non-defectiveness, the determination unit 32 determines that it is appropriate to mount the component onto the board at the set setting position. On the other hand, if the inspection result output from the machine learning model indicates defectiveness, the determination unit 32 determines that it is inappropriate to mount the component onto the board at the set setting position.

If the inspection result output from the machine learning model indicates non-defectiveness, namely, if it is appropriate to mount a component on the board at the set setting position, the position retrieval unit 33 generates, as an instruction regarding component mounting onto the board, an instruction to mount the component onto the board at the setting position set in the setting information (S105). The position retrieval unit 33 transmits the generated instruction to the component mounting apparatus 3, and allows the component mounting apparatus 3 to mount the component onto the board at the setting position set in the setting information. It is assumed, for example, that the component has been superimposed on the image I2 at the position where (X, Y)=(Xa+Xb0, Ya+Yb0) is satisfied in the synthesis image I3, as described above. Also, it is assumed, for example, that an inspection result indicating non-defectiveness has been output from the machine learning model, in response to an input of image data based on the images I1 to I3. In this case, the position retrieval unit 33 allows the component mounting apparatus 3 to mount the component onto the board at a position corresponding to (X, Y)=(Xa+Xb0, Ya+Yb0). That is, the position retrieval unit 33 allows the component mounting apparatus 3 to mount the component onto the board at a setting position (Xb0, Yb0).

If the inspection result output from the machine learning model indicates defectiveness, namely, if it is inappropriate to mount the component onto the board at the set setting position, the position retrieval unit 33 changes the setting position set in the setting information (S101). That is, the setting information set as the position at which the component is to be mounted on the board in the setting information is reset, and the setting information is updated. It is assumed, for example, that the component has been superimposed on the image I2 at the position where (X, Y)=(Xa+Xb0, Ya+Yb0) is satisfied in the synthesis image I3, as described above. Also, it is assumed, for example, that an inspection result indicating that defectiveness will occur has been output from the machine learning model, in response to an input of image data based on the images I1 to I3. In this case, the setting position set by the setting information is changed, for example, from (Xb, Yb)=(Xb0, Yb0) to (Xb, Yb)=(Xb1, Yb1).

The image processing unit 31 newly generates a synthesis image I3 by synthesizing the component with the image I2 based on the image I2, which is a pre-mount image, the adsorption information, and the setting information in which the setting position has been changed (S102). At this time, a position of the component to be superimposed in the synthesis image I3 is determined based on the setting information in which the setting position has been changed. If, for example, the setting position shown by the setting information is changed to (Xb, Yb)=(Xb1, Yb1), the component is superimposed at a position where (X, Y)=(Xa+Xb1, Ya+Yb1) is satisfied in the newly generated synthesis image I3. By newly generating the synthesis image I3, as described above, the image processing unit 31 updates the synthesis image I3. In the case where the synthesis image I3 is newly generated, the setting position in the setting information is changed from that generated in the previous synthesis image I3; however, for the image I2 and the image to be the adsorption information, data identical to that of the previous synthesis image I3 is used.

Figure 5:
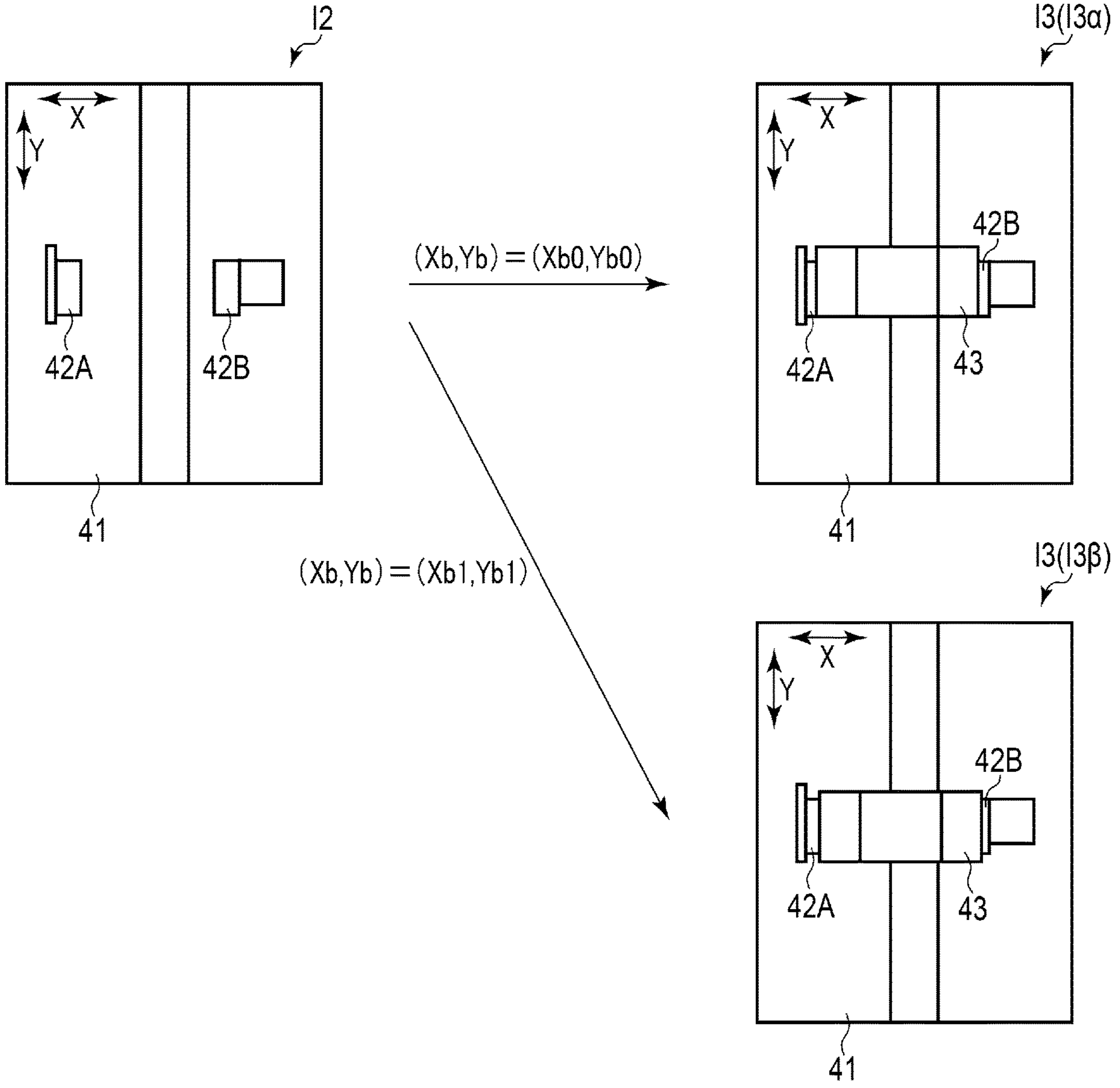
FIG. 5 is a schematic diagram showing an example of generating a synthesis image based on a pre-mount image, adsorption information, and setting information in the information processing apparatus according to the first embodiment.

FIG. 5 shows an example in which a synthesis image I3 is generated based on the image I2, the adsorption information, and the setting information. In the example of FIG. 5, a state is shown in which only solder 42A and 42B is mounted on the board 41 in the image I2. In the example of FIG. 5, the synthesis image I3 is generated by synthesizing a component 43 with the image I2 based on the adsorption information and the setting information. If the setting position in the setting information is set to (Xb, Yb)=(Xb0, Yb0), the component 43 is synthesized with the image I2 at a position where (X, Y)=(Xa+Xb0, Ya+Yb0) is satisfied, and a synthesis image I3α is generated as the synthesis image I3. Also, if the setting position in the setting information is set to (Xb, Yb)=(Xb1, Yb1), the component 43 is synthesized with the image I2 at a position where (X, Y)=(Xa+Xb1, Ya+Yb1) is satisfied, and the synthesis image I3β is generated as the synthesis image I3.

In the example of FIG. 5, since the setting positions used for generating the synthesis images I3α and I3β differ from each other, the component 43 to be synthesized is deviated from both the X direction (left-right direction in the synthesis images I3α and I3β) and the Y direction (up-down direction in the synthesis images I3α and I3β) in the synthesis images I3α and I3β. In each of the images I2, I3α, and I3β shown in FIG. 5, the direction shown by the arrow X shows the X direction, and the direction shown by the arrow Y shows the Y direction.

As shown in FIG. 4, etc., if the synthesis image I3 is updated, the image processing unit 31 newly generates image data to be used in processing at the determination unit 32 using the images I1 and I2, which are pre-mount images prior to component mounting, and the updated synthesis image I3 (S103). Thereby, the image data to be input to the machine learning model is updated. If image data to be input to the machine learning model is newly generated, the synthesis image I3 is updated from the previously generated image data; however, for the images I1 and I2, data identical to the previously generated image data is used.

Also, the determination unit 32 determines whether or not defectiveness will occur in a post-reflow inspection in the inspection apparatus 5 by inputting the updated image data to the machine learning model (S104). Thereby, the determination unit 32 determines whether or not it is appropriate to mount the component onto the board at the setting position that has been changed in the setting information. If it is appropriate to mount the component onto the board at the changed setting position, the position retrieval unit 33 generates, as an instruction regarding component mounting onto the board, an instruction to mount the component onto the board at the changed setting position (S105), and transmits the generated instruction to the component mounting apparatus 3. On the other hand, if it is inappropriate to mount the component onto the board at the changed setting position, the position retrieval unit 33 further changes the setting position set in the setting information (S101). The processing execution unit 21, etc. sequentially performs processing at S102 and thereafter, using the setting information in which the setting position has been further changed.

With the above-described processing performed by the processing execution unit 21, every time the inspection result output from the machine learning model indicates defectiveness, the setting position set as the position at which the component is to be mounted on the board in the setting information is changed. Also, the synthesis image I3 and the image data based on the images I1 to I3 is updated based on the setting information in which the setting position has been changed, and it is determined, by inputting the updated image data to the machine learning model, whether or not defectiveness will occur in a post-reflow inspection to be performed in the inspection apparatus 5. That is, in the present embodiment, until the inspection result output from the machine learning model indicates non-defectiveness, the setting position in the setting information is changed, and whether or not it is appropriate to mount the component onto the board at the changed setting position is determined using the machine learning model.

Accordingly, the position retrieval unit 33, etc. retrieves, as the position at which the component is to be mounted on the board, a position at which the inspection result output from the machine learning model indicates non-defectiveness, based on the determination result at the determination unit 32 using the machine learning model. Thereby, the position at which the inspection result output from the machine learning model indicates non-defectiveness is retrieved as the position at which the component is to be mounted on the board. The position retrieval unit 33 allows the component to be mounted onto the board in the component mounting apparatus 3 at the position retrieved as the position at which the inspection result output from the machine learning model indicates non-defectiveness by, for example, transmitting an instruction regarding component mounting onto the board to the component mounting apparatus 3.

In one example, the posture of the component to be mounted on the board in the component mounting apparatus 3 is adjustable, and a setting posture is set in addition to the setting position in the setting information. If the inspection result output from the machine learning model indicates defectiveness, the position retrieval unit 33 may change the setting posture as well as the setting position set in the setting information. In this case, for example, the setting position shown by the setting information is changed from (Xb, Yb)=(Xb0, Yb0) to (Xb, Yb)=(Xb1, Yb1), and the setting posture shown by the setting information is changed from θb=θb0 to θb=θb1. In the present example, the image processing unit 31 updates the synthesis image I3 based on setting information in which the setting position and the setting posture have been changed, and newly generates image data to be input to the machine learning model using the updated synthesis image I3, as described above.

Figure 6:
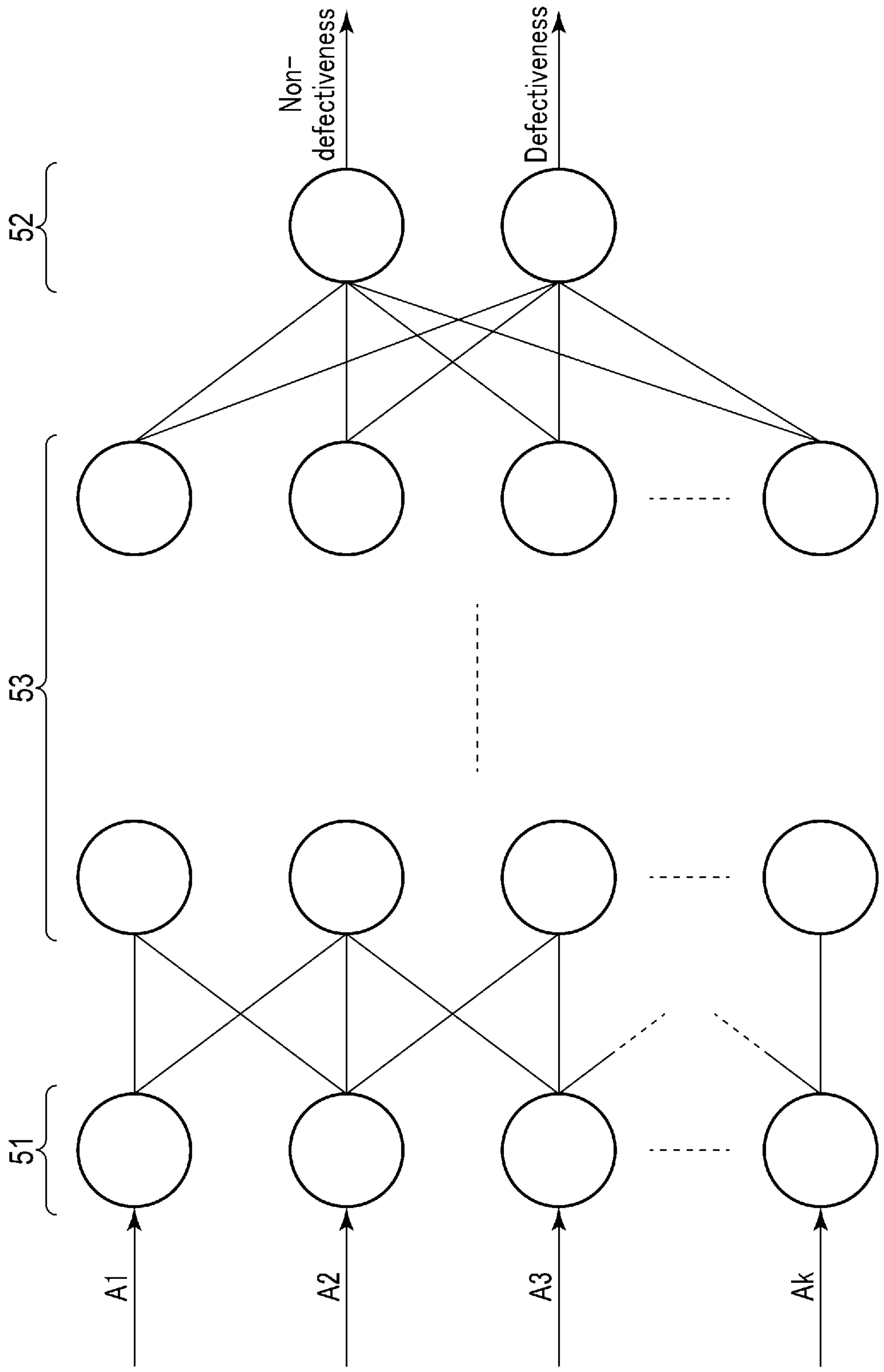
FIG. 6 is a schematic diagram showing an example of a machine learning model used for determination by a determination unit in the information processing apparatus according to the first embodiment.

FIG. 6 shows an example of a machine learning model used for determination by the determination unit 32. As shown in FIG. 6, etc., the machine learning model is configured of an input layer 51, an output layer 52, and an intermediate layer (hidden layer) 53 between the input layer 51 and the output layer 52. If the above-described image data is input to the machine learning model, pixel information such as an RGB value of each pixel is input to the input layer 51, with respect to all the images configuring the image data. In the above-described example in which image data obtained by synthesizing the images I1 to I3 is generated as image data to be input to the machine learning model, pixel information of each pixel is input to the input layer 51, with respect to the image obtained by the synthesis. In another example in which image data in which the images I1 to I3 are lined up is generated as image data to be input to the machine learning model, pixel information of each pixel is input to the input layer 51 with respect to all of the three types of images I1 to I3 that are lined up.

In the machine learning model according to an example of FIG. 6, etc., the input layer 51 is configured of the same number of nodes as the number of all the pixels in all the images configuring the image data to be input. In the example of FIG. 6, etc., the number of all the pixels in all the images configuring the image data to be input is k, and pixel information items A1 to Ak is input to the input layer 51. In the machine learning model of the example of FIG. 6, etc., the output layer 52 is configured of a node that outputs that defectiveness will not occur in an inspection and a node that outputs that defectiveness will occur in an inspection.

Also, the intermediate layer 53 is configured of convolutional layers, pooling layers, a fully connected layer, etc. In the convolutional layers, feature parts are extracted from an image by performing a filtering process for each pixel. In the pooling layers, the image is reduced in size, while maintaining the feature parts of the image. Through the processing at the pooling layers, position gaps of the feature parts in the image configuring the image data input to the machine learning model are absorbed. In the intermediate layer 53, features of the image are recognized through processing at the convolutional layers and the pooling layers. In the fully connected layer, the image data of which the feature parts have been recognized at the convolutional layers and the pooling layers is converted into one-dimensional data. Through the above-described processing, the feature parts in the image are recognized in the intermediate layer 53 of the machine learning model, and the recognized feature parts are converted into information used for determining whether or not defectiveness will occur in the inspection.

In the machine learning model, by inputting image data based on a pre-reflow image, an inspection result of a post-reflow inspection is output. The image data to be input is generated based on, for example, three types of images, including an image of only a board, an image of the board on which only solder is mounted, and an image of the board on which solder and a component are mounted. In generation of image data to be input to the machine learning model in the determination by the determination unit 32, an image I1 is used as the image of only the board, and an image I2 is used as the image of the board on which only solder is mounted. A synthesis image I3 is used as the image of the board on which solder and the component are mounted.

The machine learning model used for the determination by the determination unit 32 is generated (constructed) by a learning model generation unit 35. In the generation of the machine learning model, learning data configured of a large number of data sets is used. In each data set of the learning data, image data based on a pre-reflow image is shown for a printed board that has previously been inspected; for example, image data based on three types of images including an image of only a board, an image of the board on which only solder is mounted, and an image of the board on which solder and a component are mounted is shown. The image data shown in each data set is generated using a pre-reflow image in a manner similar to one of the above-described examples. That is, the image data shown in each of the data sets is generated by, for example, synthesizing a plurality of types of pre-reflow images, or lining up a plurality of types of pre-reflow images.

In each of the data sets of the learning data, an inspection result of a post-reflow inspection that has been actually performed is shown for a printed board on which an inspection has been previously performed. In each data set, the above-described image data and inspection result may be shown with respect to the printed boards that have been previously inspected in the manufacturing system 1, or the above-described image data and inspection result may be shown with respect to the printed boards that have been previously inspected in another manufacturing system similar to the manufacturing system 1. Since the learning data is configured as described above, in each of the large number of data sets of the learning data, image data based on a pre-reflow image and an inspection result of a post-reflow inspection that has been actually performed are associated with each other with respect to the printed boards that have been previously inspected. It is to be noted that the inspected printed boards differ among the large number of data sets.

Figure 7:
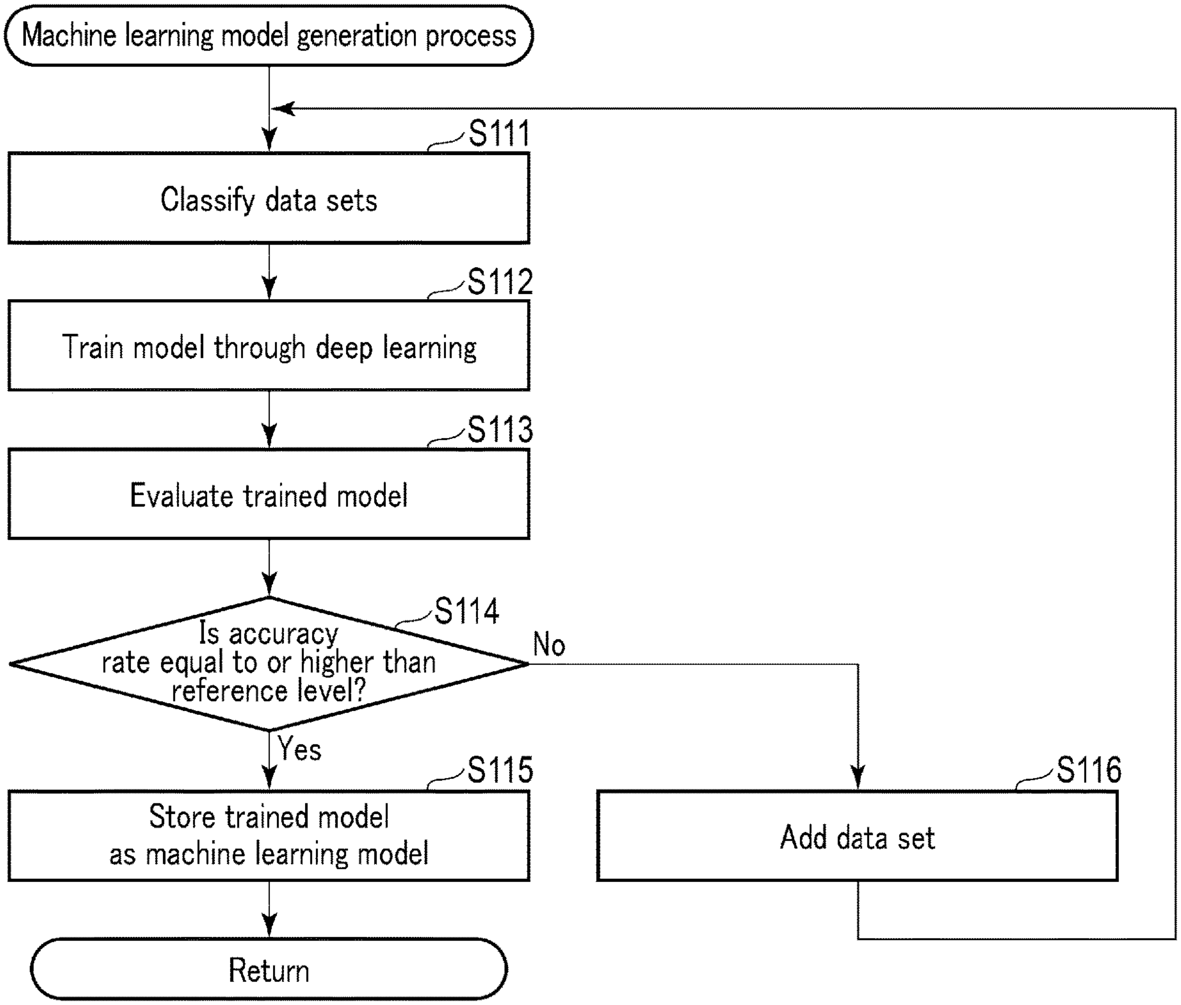
FIG. 7 is a flowchart schematically showing an example of a generation process (construction process) of a machine learning model by a learning model generation unit in the information processing apparatus according to the first embodiment.

FIG. 7 shows an example of a generation process (construction process) of a machine learning model by the learning model generation unit 35. If processing of FIG. 7 is started, the learning model generation unit 35 classifies the large number of data sets of the learning data into a training data set and an evaluation data set (S111). In one example, a large number of data sets are classified in such a manner that the ratio of the number of the training data sets to the number of the evaluation data sets becomes nine. The learning model generation unit 35 trains a model through deep learning using a training data set of the learning model (S112). At this time, a neural network, for example, is trained as the model. The model is trained through supervised learning in which an inspection result shown in each of the training data sets is given as a correct answer. Through deep learning, the model learns features contained in the image data of the training data sets, and learns, for example, features in the image data in the case where the inspection result indicates defectiveness.

Upon completing the training using the training data sets, the learning model generation unit 35 evaluates the trained model using the evaluation data sets (S113). In the evaluation of the model, image data based on the pre-reflow image is input to the trained model, with respect to each of the evaluation data sets. A comparison is made between an output result from the trained model and an inspection result of an inspection that has been actually performed, with respect to each of the evaluation data sets. An accuracy ratio of the output result from the model is calculated, as an index for evaluating the trained model, for the inspection result of the actually performed inspection.

After completing the evaluation using the evaluation data sets, the learning model generation unit 35 determines whether or not the accuracy ratio calculated as the index for evaluating the trained model is equal to or higher than a reference level (S114). In one example, the accuracy ratio is determined to be equal to or higher than a reference level based on the accuracy ratio being equal to or higher than 90%. If the accuracy ratio is equal to or higher than the reference level (S114—Yes), the learning model generation unit 35 stores the trained model in the storage module 22 as the above-described machine learning model to be used in the determination by the determination unit 32 (S115).

If the accuracy is lower than the reference level (S114—No), the learning model generation unit 35 adds a data set in the learning data (S116). The processing returns to S111, and the learning model generation unit 35 sequentially performs processing at S111 and thereafter. Thereby, training of the model using the added data set and the evaluation of the model using the added data set are performed. It is to be noted that the learning model generation unit 35 need not be provided in the information processing apparatus 6. In one example, a generation process (construction process) of the above-described machine learning model is performed by a computer, etc. different from the information processing apparatus 6.

In the information processing apparatus 6, the learning model updating unit 36 retrains the machine learning model, and thereby updates the machine learning model. The learning model updating unit 36 stores the updated machine learning model in the storage module 22. In one example, upon every occurrence of a situation in which an inspection result output from the machine learning model as a result of determination by the determination unit 32 differs from an inspection result of an actually performed inspection, retraining of the machine learning model is performed. In another example, in response to an accuracy ratio of an inspection result output from the machine learning model as a result of the determination by the determination unit 32 to the inspection result of an actually performed inspection becoming lower than the reference level, retraining of the machine learning model is performed. In this case, based on, for example, the above-described accuracy ratio becoming lower than 90%, the accuracy ratio is determined to be lower than the reference level. In another example, regardless of the above-described accuracy ratio, etc., the machine learning model is periodically retrained at predetermined intervals.

Updating of the machine learning model is performed in a manner similar to the generating of the machine learning model. That is, in updating of the machine learning model, a large number of data sets are used, and in each of the used data sets, image data based on a pre-reflow image and an inspection result of a post-reflow inspection that has been actually performed are associated with each other, for the printed boards that have been inspected. The learning model updating unit 36 classifies the data sets into training data sets and evaluation data sets, and the machine learning model is retrained using a training data set, in a manner similar to the training of the model in the generation of the machine learning model. Upon completing the retraining, the retrained machine learning model is evaluated in a manner similar to the evaluation of the trained model in the generation of the machine learning model.

With the above-described updating of the machine learning model, in the updated machine learning model, the accuracy ratio of the inspection result output from the machine learning model to the inspection result of the actually performed inspection becomes equal to or higher than the reference level. In the updating of the machine learning model, in some of a large number of data sets used for retraining, data, in the case where an inspection result output from the machine learning model as a result of determination by the determination unit 32 differs from an inspection result of a post-reflow inspection that has been actually performed, are shown. Accordingly, the learning model updating unit 36 retrains the machine learning model in the case where an inspection result output from the machine learning model as a result of determination by the determination unit 32 differs from an inspection result of a post-reflow inspection that has been actually performed.

In one example, in the case where the inspection result output from the machine learning model as a result of determination by the determination unit 32 had indicated that defectiveness will not occur, but defectiveness has occurred in an actual inspection result, the machine learning model is retrained. In this case, in some of a large number of data sets used for retraining, image data input to the machine learning model in outputting of the inspection result indicating non-defectiveness, and the inspection result of the post-reflow inspection that has been actually performed are shown. The image data input to the machine learning model in outputting of an inspection result indicating non-defectiveness is the image data based on the images I1 and I2 and the synthesis image I3, as described above.

Accordingly, in retraining of the machine learning model, in the case where it has been newly found that defectiveness will occur in an inspection, the image data based on the images I1 to I3 and the inspection result are shown in any one of the data sets. In the retraining, the machine learning model learns features of image data based on the images I1 to I3 with respect to the data set showing the image data and inspection result in the case where it has been newly found that defectiveness will occur in an inspection. It is to be noted that the learning model updating unit 36 need not be provided in the information processing apparatus 6. In one example, an update process of the above-described machine learning model is performed by a computer, etc. different from the information processing apparatus 6.

As described above, in the present embodiment, a synthesis image I3 is generated by synthesizing the component with a pre-mount image (e.g., I2) prior to component mounting onto the board, based on the pre-mount image, adsorption information indicating an adsorption state of the component in the component mounting apparatus 3, and setting information indicating a setting position set as the position at which the component is to be mounted on the board. By inputting, to the machine learning model that outputs an inspection result of a post-reflow inspection from an input of image data based on a pre-reflow image, image data based on a pre-mount image (e.g., I2) and a synthesis image I3, whether or not it is appropriate to mount the component onto the board at the setting position set in the setting information is determined. Thus, whether or not the component will be appropriately joined to the board by component mounting onto the board at the setting position is determined prior to a reflow process in consideration of the state of the board prior to mounting of the component such as a state of mounting of solder onto the board, in addition to the adsorption state of the component in the component mounting apparatus 3. Accordingly, it is possible to correctly determine whether or not the position at which the component is to be mounted onto the board is appropriate prior to a reflow process.

In the present embodiment, if it is determined that it is inappropriate to mount the component at the setting position based on an inspection result output from the machine learning model, the setting position in the setting information is changed. The synthesis image I3 is updated based on the changed setting position, and the image data to be input to the machine learning model is updated based on the updated synthesis image I3. Based on the inspection result output from the machine learning model in response to the input of the updated image data, whether or not it is appropriate to mount the component onto the board at the changed setting position is determined. With the above-described processing, a position at which the inspection result output from the machine learning model indicates non-defectiveness, namely, a position at which a component will be appropriately joined to the board, is appropriately retrieved as the position at which the component is to be mounted on the board. Thus, an appropriate position corresponding to an adsorption state in the component mounting apparatus 3 and a state of the board prior to mounting of the component is retrieved as the position at which the component is to be mounted on the board.

Also, the information processing apparatus 6 allows the component mounting apparatus 3 to mount the component onto the board at the position retrieved as the position at which the inspection result output from the machine learning model indicates non-defectiveness. It is thereby possible to effectively suppress occurrence of printed boards that will be defective in a post-reflow inspection, etc. By suppressing occurrence of printed boards that will be defective in a post-reflow inspection, it is possible to appropriately reduce a loss of members, and to effectively suppress an increase in the number of steps required to repair defective printed boards in manufacturing of printed boards. Also, by suppressing occurrence of printed boards that become defective after a reflow process, it is possible to improve a yield in manufacturing of printed boards.

In the present embodiment, in generating of a machine learning model, a model is trained through deep learning using learning data in which image data based on a pre-reflow image is associated with an inspection result of a post-reflow inspection that has been actually performed. Thereby, through inputting of image data based on a pre-mount image prior to mounting of a component, such as images I1 and I2, and a synthesis image I3 generated by synthesizing a pre-mount image with a component, a machine learning model that appropriately outputs an inspection result of an a post-reflow inspection is generated. By determining whether or not it is appropriate to mount a component onto the board at the setting position using a machine learning model generated as described above, it is possible to further correctly determine whether or not the position at which the component is to be mounted onto the board is appropriate.

In the present embodiment, a machine learning model is retrained in the case where an inspection result output from the machine learning model differs from an inspection result of a post-reflow inspection that has been actually performed. The retraining is performed in the case where the inspection result output from the machine learning model differs from the inspection result of the post-reflow inspection that has been actually performed, using the image data based on the pre-mount image (e.g., I2) and the synthesis image I3 input to the machine learning model and the inspection result of the inspection that has been actually performed. With the above-described updating of the machine learning model, it is possible to effectively suppress a decrease in an accuracy ratio of the inspection result output from the machine learning model to the inspection result of the actual inspection. By determining whether or not it is appropriate to mount a component onto the board at the setting position using a machine learning model generated as described above, it is possible to further correctly determine whether or not the position at which the component is to be mounted onto the board is appropriate.

(Modification)

Figure 8:
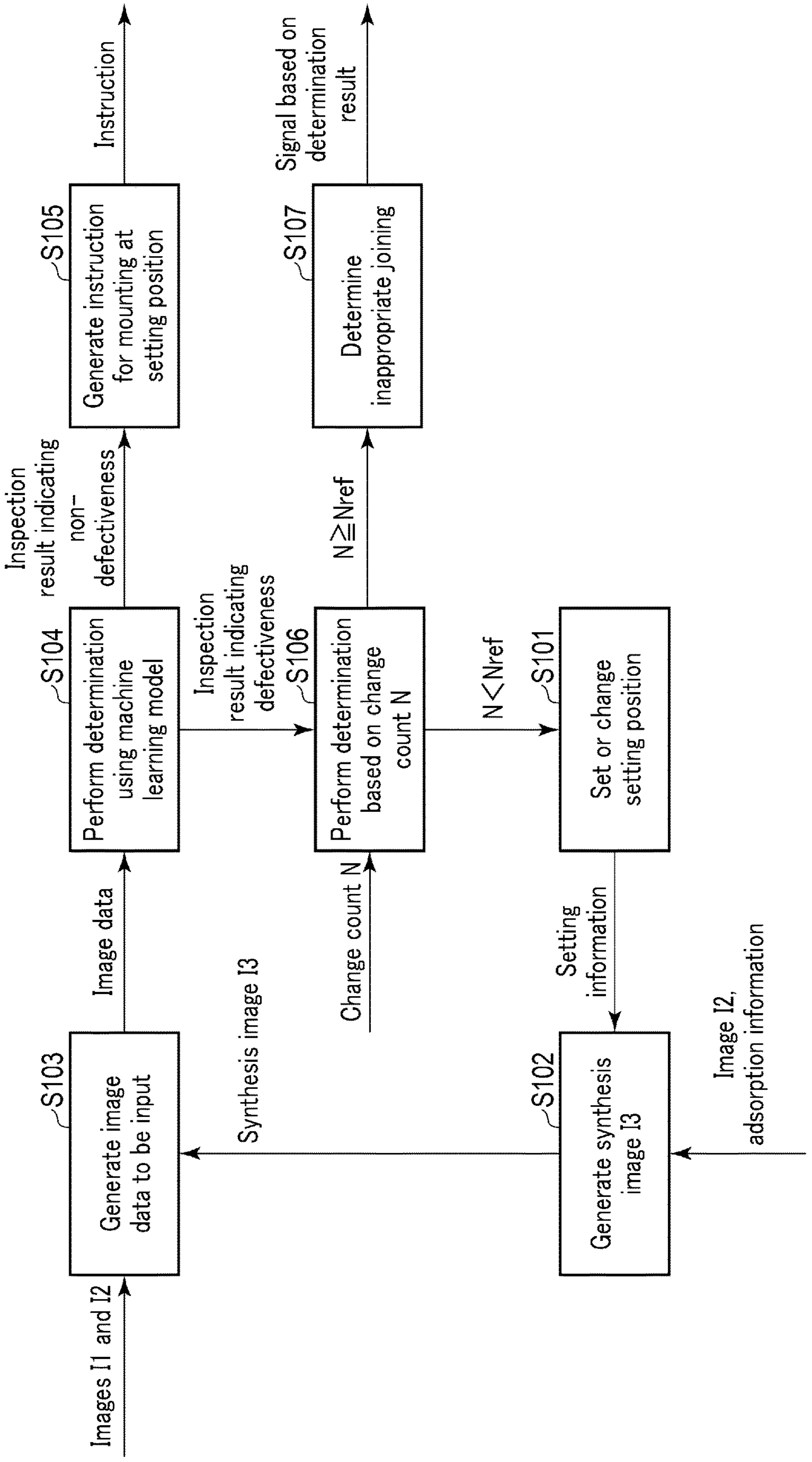
FIG. 8 is a schematic diagram showing an example of processing by an image processing unit, a determination unit, and a position retrieval unit in an information processing apparatus of a manufacturing system according to a modification.

FIG. 8 shows an example of processing performed by an image processing unit 31, a determination unit 32, and a position retrieval unit 33 according to a modification. The processing shown in FIG. 8 is performed every time a single board is conveyed to the manufacturing line. As shown in FIG. 8, etc., in the present modification, the processing from S101 to S105 is performed by the processing execution unit 21 in a manner similar to the above-described embodiment, etc. In the present modification, however, a change count N, indicating the number of times a setting position has been changed in setting information, is defined. The determination unit 32 increments the change count N by one every time the setting position shown by the setting information is changed by processing at S101. The change count N is reset to zero every time a board is conveyed to the manufacturing line.

In the present modification, if an inspection result output from the machine learning model at S104 indicates defectiveness, namely, if it is inappropriate to mount a component onto the board at the set setting position, the determination unit 32 performs determination based on the change count N (S106). That is, the determination unit 32 determines whether or not the change count N indicating the number of times the setting position has been changed is equal to or greater than a reference count Nref. If the change count N is smaller than the reference count Nref, the position retrieval unit 33 changes the setting position set in the setting information (S101). On the other hand, if the change count N is equal to or greater than the reference count Nref, the determination unit 32 determines that the component will not be appropriately joined to the board by a reflow process no matter which position the component is mounted at on the board (S107). That is, it is determined that the component will not be appropriately joined to the board regardless of the position at which the component is to be mounted on the board.

If the determination at S107 is performed, the processing execution unit 21 including the determination unit 32 generates a signal based on the determination result that the component will not be appropriately joined to the board, and outputs the generated signal. In one example, a signal warning that the component will not be appropriately joined to the board regardless of the position at which the component is to be mounted on the board is output from the processing execution unit 21, and the warning is issued using a user interface 25, etc. In another example, instead of, or in addition to, the warning, an instruction (an instruction signal) instructing stopping of an operation of mounting the component onto the board is output from the processing execution unit 21 to the component mounting apparatus 3. Based on the instruction from the information processing apparatus 6, the component mounting apparatus 3 stops the operation of mounting the component onto the board.

The present modification produces advantageous effects similar to those of the above-described embodiment, etc. In the present modification, if the change count N indicating the number of times the setting position has been changed in the setting information is equal to or greater than the reference count Nref, it is determined that the component will not be appropriately joined to the board by a reflow process no matter which position the component is mounted at on the board. It is thereby possible to effectively prevent, in the case where, for example, the component will not be appropriately joined to the board regardless of the position at which the component is to be mounted on the board, continuing to retrieve an appropriate position at which the component should be mounted on the board.

In another modification, even if an inspection result output from the machine learning model in processing at S104, etc. indicates non-defectiveness, as long as a change count N indicating the number of times a setting position has been changed is smaller than a reference count Nref, the position retrieval unit 33 changes the setting position set in setting information in processing at S101, etc. If there are a plurality of setting positions at which the inspection result indicates non-defectiveness, the position retrieval unit 33, etc. selects, from among the plurality of setting positions at which the inspection result indicates non-defectiveness, a setting position that has the largest margin from the setting position at which the inspection result indicates defectiveness as the position at which the component is to be mounted. The present modification produces advantageous effects similar to those of the above-described embodiment, etc.

In the above-described embodiment, etc., image data to be input to the machine learning model is generated using three types of images I1 to I3, namely, an image I1 of only a board, an image I2 of the board on which only solder is mounted, and a synthesis image I3 generated by synthesizing the component with the image I2; however, the configuration is not limited thereto. In another modification, image data to be input to the machine learning model is generated using only two types of images, namely, an image I2 and a synthesis image I3. In this case, too, a synthesis image I3 is generated based on the image I2, which is a pre-mount image, as well as adsorption information and setting information, in a manner similar to the above-described embodiment. By inputting image data based on the image I2 and the synthesis image I3 to the machine learning model, whether or not it is appropriate to mount a component onto the board at the setting position set in the setting information is determined, similarly to the above-described embodiment, etc.

In another modification, in the determination at the determination unit 32, information indicating reflow conditions are input to the machine learning model, in addition to the image data based on the pre-mount image (e.g., I2) and the synthesis image I3. In this case, too, an inspection result of a post-reflow inspection is output from the machine learning model, and the determination unit 32 determines whether or not it is appropriate to mount a component onto the board at the setting position based on an inspection result output from the machine learning model in a manner similar to the above-described embodiment, etc. The information indicating the reflow conditions includes specification information of the reflow apparatus 4 and an environmental temperature, etc. of an environment under which the reflow process is performed.

In another modification, in the determination at the determination unit 32, information indicating a solder thickness may be input to the machine learning model, in addition to the image data based on the pre-mount image (e.g., I2) and the synthesis image I3. Also, in addition to the above-described image data based on the pre-mount images (e.g., I1 and I2) and the synthesis image I3, position information regarding a height direction (a thickness direction of the board and solder) in each of the pre-mount images may be input to the machine learning model. As the position information regarding a height direction in each of the pre-mount images, an image showing a height distribution in each of the pre-mount images, for example, is shown. In the present modification, too, an inspection result of a post-reflow inspection is output from the machine learning model, and the determination unit 32 determines whether or not it is appropriate to mount a component onto the board at the setting position based on an inspection result output from the machine learning model, in a manner similar to the above-described embodiment, etc.

According to at least one embodiment or example described above, a synthesis image is generated by synthesizing a component with a pre-mount image prior to mounting of a component onto a board, based on the pre-mount image, adsorption information indicating an adsorption state of the component at the component mounting apparatus, and setting information indicating a setting position set as a position at which the component is to be mounted on the board. Thereafter, image data based on the pre-mount image and the synthesis image is input to a machine learning model that outputs an inspection result of a post-reflow inspection from image data based on a pre-reflow image, and whether or not it is appropriate to mount the component onto the board at the setting position is determined. It is thereby possible to provide an information processing apparatus and an information processing method capable of correctly determining whether or not the position at which the component is to be mounted on the board is appropriate prior to a reflow process.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing apparatus for soldering a component onto a board, the apparatus comprising:

an image processing unit configured to generate a synthesis image by synthesizing an image of the component with a pre-mount image, the pre-mount image being photographed prior to mounting of the component onto the board, the synthesis image being generated based on the pre-mount image, adsorption information indicating an adsorption state of the component in a component mounting apparatus, and setting information indicating a setting position set as a position at which the component is to be mounted on the board; and a determination unit configured to determine whether or not it is appropriate to mount the component onto the board at the setting position set in the setting information by inputting, to a machine learning model, image data based on the pre-mount image and the synthesis image, the machine learning model outputting information indicating whether or not defectiveness will occur in an inspection from an input of image data based on an image prior to a reflow process, the inspection being performed after the reflow process.

2. The information processing apparatus according to claim 1, further comprising a position retrieval unit configured to retrieve, as the position at which the component is to be mounted on the board, a position at which the information output from the machine learning model indicates non-defectiveness, based on a result of the determining at the determination unit.

3. The information processing apparatus according to claim 2, wherein the position retrieval unit changes the setting position set in the setting information as the position at which the component is to be mounted if the information output from the machine learning model indicates defectiveness, the image processing unit updates the synthesis image based on the setting information in which the setting position has been changed, in addition to the pre-mount image and the adsorption information, and the determination unit inputs image data based on the pre-mount image and the updated synthesis image to the machine learning model, thereby determining whether or not it is appropriate to mount the component onto the board at the setting position changed in the setting information.

4. The information processing apparatus according to claim 3, wherein the determination unit determines, if a change count indicating a number of times the setting position has been changed in the setting information is equal to or greater than a reference count, that the component will not be appropriately joined to the board by the reflow process no matter which position the component is mounted at on the board.

5. The information processing apparatus according to claim 2, wherein the position retrieval unit allows the component mounting apparatus to mount the component onto the board at the position retrieved as the position at which the information output from the machine learning model indicates non-defectiveness.

6. The information processing apparatus according to claim 1, further comprising:

a learning model generation unit configured to generate the machine learning model by training a model through deep learning using learning data in which image data based on an image prior to a reflow process is associated with an inspection result of an inspection that has been actually performed after the reflow process.

7. The information processing apparatus according to claim 1, further comprising:

a learning model updating unit configured to update, if the information output from the machine learning model differs from the inspection result of the inspection that has been actually performed after the reflow process, the machine learning model by retraining the machine learning model using the image data based on the pre-mount image and the synthesis image input to the machine learning model and the inspection result of the inspection that has been actually performed.

8. The information processing apparatus according to claim 1, wherein the image processing unit generates the synthesis image by synthesizing the component with an image of the board on which only solder is mounted, using the image of the board on which only the solder is mounted as the pre-mount image, and the image processing unit generates the image data to be input to the machine learning model using the image of the board on which only the solder is mounted and the synthesis image.

9. The information processing apparatus according to claim 8, wherein the image processing unit generates the image data to be input to the machine learning model using an image of only the board, in addition to the image of the board on which only the solder is mounted and the synthesis image.

10. An information processing method for soldering a component onto a board, the method comprising:

generating a synthesis image by synthesizing an image of the component with a pre-mount image, the pre-mount image being photographed prior to mounting of the component onto the board, the synthesis image being generated based on the pre-mount image, adsorption information indicating an adsorption state of the component at a component mounting apparatus, and setting information indicating a setting position set as a position at which the component is to be mounted on the board; and determining whether or not it is appropriate to mount the component onto the board at the setting position set in the setting information by inputting, to a machine learning model, image data based on the pre-mount image and the synthesis image, the machine learning model outputting information indicating whether or not defectiveness will occur in an inspection from an input of image data based on an image prior to a reflow process, the inspection being performed after the reflow process.

* * * * *